United States Patent
Lim et al.

(10) Patent No.: US 7,620,020 B2
(45) Date of Patent: Nov. 17, 2009

(54) SYSTEM AND METHOD FOR PERFORMING RANGING PROCESS IN A COMMUNICATION SYSTEM

(75) Inventors: Ae-Ri Lim, Anyang-si (KR); Yun-Sang Park, Suwon-si (KR); Kyeong-Tae Do, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 593 days.

(21) Appl. No.: 11/370,289

(22) Filed: Mar. 8, 2006

(65) Prior Publication Data

US 2006/0203712 A1  Sep. 14, 2006

(30) Foreign Application Priority Data

Mar. 9, 2005  (KR)  ............... 10-2005-0019853

(51) Int. Cl.
    *H04B 7/216* (2006.01)
(52) U.S. Cl. ............... 370/335; 370/310; 370/311; 455/435.1; 455/436
(58) Field of Classification Search ......... 370/335, 370/310, 311; 455/435.1, 436
    See application file for complete search history.

(56) References Cited

U.S. PATENT DOCUMENTS

| 2003/0198179 A1 | 10/2003 | Koo et al. | |
| 2005/0281212 A1* | 12/2005 | Jeong et al. | 370/310 |
| 2006/0121898 A1* | 6/2006 | Kim et al. | 455/435.1 |
| 2007/0249351 A1* | 10/2007 | An et al. | 455/436 |
| 2007/0274265 A1* | 11/2007 | Yoon et al. | 370/335 |
| 2008/0123576 A1* | 5/2008 | Son et al. | 370/311 |

FOREIGN PATENT DOCUMENTS

WO  WO 2005/040960  5/2005

OTHER PUBLICATIONS

Hang Zhang et al., Enhanced Initial Ranging and BW Request Ranging; IEEE 802.16 Broadband Wireless Access Working Group, Aug. 28, 2004.
Carl Eklund et al., IEEE Standard 802.16: A Technical Overview of the WirelessMAN™ Air Interface for Broadband Wireless Access, IEEE Communications Magazine, Jun. 2002, pp. 98-107.
Chulsik Yoon et al., Changes on CDMA-Based BW Request Procedures in OFDMA-PHY for Mobile Environment, Oct. 31, 2003.
IEEE Std 802.16-2004, IEEE Standard for Local and Metropolitan Area Networks; Part 16: Air Interface for Fixed Broadband Wireless Access Systems, 2004.

* cited by examiner

Primary Examiner—Sudhanshu C Pathak
(74) Attorney, Agent, or Firm—The Farrell Law Firm, LLP

(57) ABSTRACT

Provided is a system and method for performing a ranging process in a communication system. If a Subscriber Station (SS) detects the insufficiency of UpLink (UL) resources for transmission of a Ranging Request (RNG_REQ) message during the ranging process, it transmits a UL resource allocation request message requesting additional allocation of the UL resources to a Base Station (BS) for additional transmission of the RNG_REQ message to cause the BS to additionally allocate the UL resources for the additional transmission of the RNG_REQ message.

29 Claims, 12 Drawing Sheets

| INFORMATION INCLUDED IN MESSAGE (Value) | | | LENGTH |
|---|---|---|---|
| 201 — Message Type = 1 | | | 8 bits |
| 203 — Downlink channel ID | | | 8 bits |
| Type | Length | (Value) | |
| 205 — 1 | 1 | Requested Downlink Burst Profile | 3 bytes |
| 207 — 2 | 6 | SS MAC Address | 8 bytes |
| 3 | 1 | Ranging Anomalies | 3 bytes |
| 148 | 1 | MAC version | 3 bytes |
| 5 | 1 | Serving BS ID | 3 bytes |
| 6 | 1 | HO Indication | 3 bytes |
| 7 | 1 | HO ID | 3 bytes |
| 9 | 1 | Location update Request | 3 bytes |
| 7 | 6 | Paging Controller ID | 8 bytes |
| 149 | 21 | HMAC Tuple | 23 bytes |
| 21 | variable | Power Saving Class Parameters | variable |
| | 1 | Power down Indicator° | 3 bytes |

FIG.3

| Name | Length(bits) | Notes |
|---|---|---|
| HT | 1 | Header Type =1 |
| EC | 1 | Always set to zero |
| Type | 3 | Indicates the type of bandwidth request header |
| 221 — CID | 16 | Connection identifier |
| BR | 19 | Bandwidth Request<br>The number of bytes of uplink bandwidth requested by the SS. The bandwidth request is for the CID. The request shall not include any PHY overhead. |
| HCS | 8 | Header Check Sequence |

FIG.4

| Name | Length(bits) | Notes |
|---|---|---|
| HT | 1 | Header Type =1 |
| EC | 1 | Always set to zero |
| Type | 3 | Indicates the type of bandwidth request header |
| CID | 16 | Initial ranging CID |
| BR | 19 | Bandwidth Request<br>The number of bytes of uplink bandwidth requested by the SS. The bandwidth request is for the CID.<br>The request shall not include any PHY overhead. |
| HCS | 8 | Header Check Sequence |

221 — CID row

FIG.6

| Syntax | Size | Notes |
|---|---|---|
| CDMA_Allocation_IE() { | | |
| Duration | 6 bits | Indicates the duration, in units of OFDMA slots, of the allocation. |
| Repetition Coding Indication | 2 bits | Indicates the repetition code used inside the allocated burst. |
| Ranging Code | 8 bits | Indicating the CDMA Code sent by the SS. When Ranging Code = 0x00, it means BW allocation for RNG-REQ. |
| Ranging Symbol | 8 bits | Indicating the OFDMA symbol used by the SS to send the CDMA code. When Ranging Code = 0x00, indicating the OFDMA symbol where BW request header with nitial-ranging CID is transmitted. |
| Ranging subchannel | 7 bits | Identifies the Ranging subchannel used by the SS to send the CDMA code. When Ranging Code = 0x00, indicating the OFDMA subchannel where BW request header with initial-ranging CID is transmitted. |
| BW request mandatory | 1 bits | Indicates whether the SS shall include a Bandwidth (BW) Request in the allocation. |
| } | | |

FIG.7

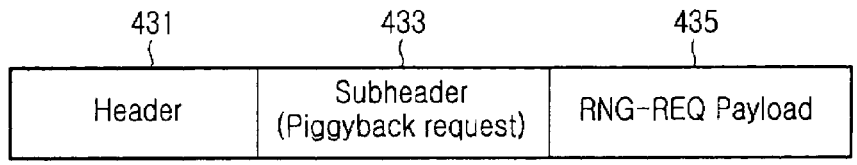

FIG.9

| Type bit | Value |
|---|---|
| #5 most significant bit (MSB) | Mesh subheader 1= present, 0= absent |
| #4 | ARQ Feedback Payload 1= present, 0= absent |
| #3 | Extended Type Indicates whether the present Packing or Fragmentation Subheaders, is Extended 1 = Extended 0 = not Extended. Applicable to connections where ARQ is not enabled |
| #2 | Fragmentation subheader 1= present, 0= absent |
| #1 | Packing subheader 1= present, 0= absent |
| #0 least significant bit (LSB) | Downlink: FAST-FEEDBACK Allocation subheader Uplink: Grant Management subheader 1= present, 0= absent |

FIG.10

| INFORMATION INCLUDED IN MESSAGE (Value) | | | LENGTH |
|---|---|---|---|
| Message Type = 1 | | | 8 bits |
| Downlink channel ID | | | 8 bits |
| Type | Length | (Value) | |
| 1 | 1 | Requested Downlink Burst Profile | 3 bytes |
| 2 | 6 | SS MAC Address | 8 bytes |
| 1 | | Requested Bandwidth for next ranging request | |

| Name | Type | Length | |
|---|---|---|---|
| Timing Adjust | 1 | 4 | TLV ELEMENTS THAT CAN BE INCLUDED IN RNG_RSP IN NETWORK ENTRY |
| Power Level Adjust | 2 | 1 | |
| Offset Frequency Adjust | 3 | 4 | |
| Ranging Status | 4 | 1 | |
| Downlink frequency override | 5 | 4 | |
| Uplink channel ID override | 6 | 1 | |
| Downlink Operational Burst Profile | 7 | 2 | |
| SS MAC Address | 8 | 6 | |
| Basic CID | 9 | 2 | |
| Primary Management CID | 10 | 2 | |
| AAS broadcast permission | 11 | 1 | |
| Ranging code Attributes | 150 | 1 | |
| Service Level Prediction | 17 | 1 | TLV ELEMENTS THAT CAN BE INCLUDED IN RNG_RSP IN HANDOFF |
| Global Service Class Name | 18 | 4 | |
| QoS Parameters | [145/146] Variable | Variable | |
| SFID | [145/146].1 | 4 | |
| Resource Retain Flag | 20 | 1 | |
| HO Process Optimization | 21 | 2 | |
| HO ID | 22 | 1 | |
| Location Update Response | 23 | 4 | |
| Paging Information | 24 | 5 | |
| Paging Controller ID | 25 | 6 | |
| Next Periodic Ranging | 26 | 2 | |
| Power-Saving-Class-Parameters | | Variable | |

FIG.14

SYSTEM AND METHOD FOR PERFORMING RANGING PROCESS IN A COMMUNICATION SYSTEM

PRIORITY

This application claims priority under 35 U.S.C. § 119 to an application entitled "System and Method for Performing Ranging Process in Communication System" filed in the Korean Intellectual Property Office on Mar. 9, 2005 and assigned Serial No. 2005-19853, the contents of which are incorporated herein by reference.

BACKGROUND OF THE INVENTION

1. Field of the Invention

The present invention relates generally to a communication system, and in particular, to a system and method for performing a ranging process in a communication system.

2. Description of the Related Art

Hereinafter, a description will be made based on an IEEE (Institute of Electrical and Electronics Engineers) 802.16 Orthogonal Frequency Division Multiple Access (OFDMA) system.

FIG. 1 is a schematic block diagram illustrating the structure of a general Broadband Wireless Access (BWA) communication system. Referring to FIG. 1, a Subscriber Station (SS) 10 generally has mobility and is connected to a Backbone Network (BN) 30 through a Base Station (BS) 20. The SS 10 allows connection between the BS 20 and a subscriber. The BS 20 provides control, management, and connectivity for the SS 10. The BN 30 is connected to an Authentication and Service Authorization (ASA) server 40 for authentication and service authentication of the SS 10.

The SS 10 needs to successfully complete a network entry process with the BS 20 to communicate on the BWA communication system. The network entry process is divided into downlink channel synchronization, initial ranging, capabilities negotiation, authentication message exchanges, registration, and Internet Protocol (IP) connectivity stages. Upon completion of the network entry process, the SS 10 creates one or more service flows to send data to the BS 20. The initial ranging in the network entry process will be described with reference to FIG. 2.

FIG. 2 is a schematic flow diagram for illustrating the initial ranging in the BWA communication system. The SS 10 begins the initial ranging by sending an initial ranging code to the BS 20 in a contention-based manner in step 101. Such code ranging allows adjustment of UpLink (UL) timing and power offset of the SS 10. The BS 20 marks in a Ranging Response (RNG_RSP) message code ranging information and a power offset adjustment value transmitted from the SS 10 and broadcasts the RNG_RSP message in step 103. Upon receipt of the RNG_RSP message, the SS 10 checks for the code ranging information and adjusts the power offset. If a status field of the RNG_RSP message indicates 'continue', the SS 10 re-attempts the code ranging in step 105.

If the BS 20 determines that timing and power adjustment are completed through the code ranging attempted by the SS 10, it marks the status field of the RNG_RSP message as 'success' and sends the RNG_RSP message to the SS 10 in step 107. The BS 20 allocates a UL bandwidth in which the SS 10 can transmit a Ranging Request (RNG_REQ) message through UL-MAP having a Code Division Multiple Access (CDMA)_Allocation_Information Element (IE). The CDMA_Allocation_IE includes the code ranging information transmitted from the SS 10 and the amount of UL resource allocated to the SS 10. If the status field of the RNG_RSP message indicates 'success', the SS 10 terminates the code ranging and attempts message ranging.

The SS 10 transmits the RNG_REQ message in the allocated UL bandwidth in step 111. Once the SS 10 receives the RNG_RSP message from the BS 20 in step 113, the ranging is completed. The SS 10 is allocated a basic Connection IDentifier (CID) and a primary CID through the ranging. These CIDs are uniquely allocated to the SS 10 from the BS 20 and are used to identify the SS 10 during an access to the BS 20. Information such as MAC address information of the SS 10 is transmitted through the RNG_REQ message. The BS 20 responds to the RNG_REQ message with the RNG_RSP message based on such information. In step 115, the SS 10 sends an SS Basic Capability Request (SBC_REQ) message through the basic CID included in the RNG_RSP message to perform capabilities negotiation.

The RNG_REQ message may include information as a Type/Length/Value (TLV) form. Since information included in a single RNG_REQ message may vary with implementation or situations, the size of the RNG_REQ message may also vary.

However, since the SS 10 is not allocated a unique CID when transmitting the RNG_REQ message, i.e., before receiving the RNG_RSP message, it cannot request the BS 20 to allocate (UL) bandwidth. If the BS 20 fails to receive the RNG_REQ message from the SS 10 in the allocated UL bandwidth, it cannot determine whether such a failure is due to a packet loss or that the SS 10 did not attempt to transmit the RNG_REQ message. Thus, the SS 10 can transmit the RNG_REQ message only after performing code raging again and being allocated the CDMA_Allocation_IE from the BS 20. In this case, since it is not guaranteed that the BS 20 will allocate a sufficient amount of resource to the SS 10 through the CDMA_Allocation_IE, the RNG_REQ message transmission problem still remains.

SUMMARY OF THE INVENTION

Therefore, the present invention solves a problem that occurs when an allocated amount of UpLink (UL) resource is insufficient during an attempted ranging.

The present invention can support an efficient network entry process for a Subscriber Station (SS) and solve a problem in an initial network entry process that may occur in the current Institute of Electrical and Electronics Engineers (IEEE) 802.16 and 802.16e standards.

BRIEF DESCRIPTION OF THE DRAWINGS

The above and other objects, features and advantages of the present invention will become more apparent from the following detailed description when taken in conjunction with the accompanying drawings in which:

FIG. 3 illustrates information included in a Ranging Request (RNG_REQ) message;

FIG. 4 illustrates information included in a Bandwidth Request message;

FIG. 6 illustrates information included in a Bandwidth Request message according to the present invention;

FIG. 7 illustrates information included in a Code Division Multiplexing Access (CDMA)_Allocation_Information Element (IE) message according to the present invention;

FIG. 9 illustrates the format of an RNG_REQ message according to the present invention;

FIG. 10 illustrates information included in a Type field of a header of the RNG_REQ message of FIG. 9;

FIG. 14 illustrates information that can be contained in a Ranging Response (RNG_RSP) message in initial network entry and information that can be contained in the RNG_RSP message in handoff;

DETAILED DESCRIPTION OF THE PREFERRED EMBODIMENT

Figure 1:
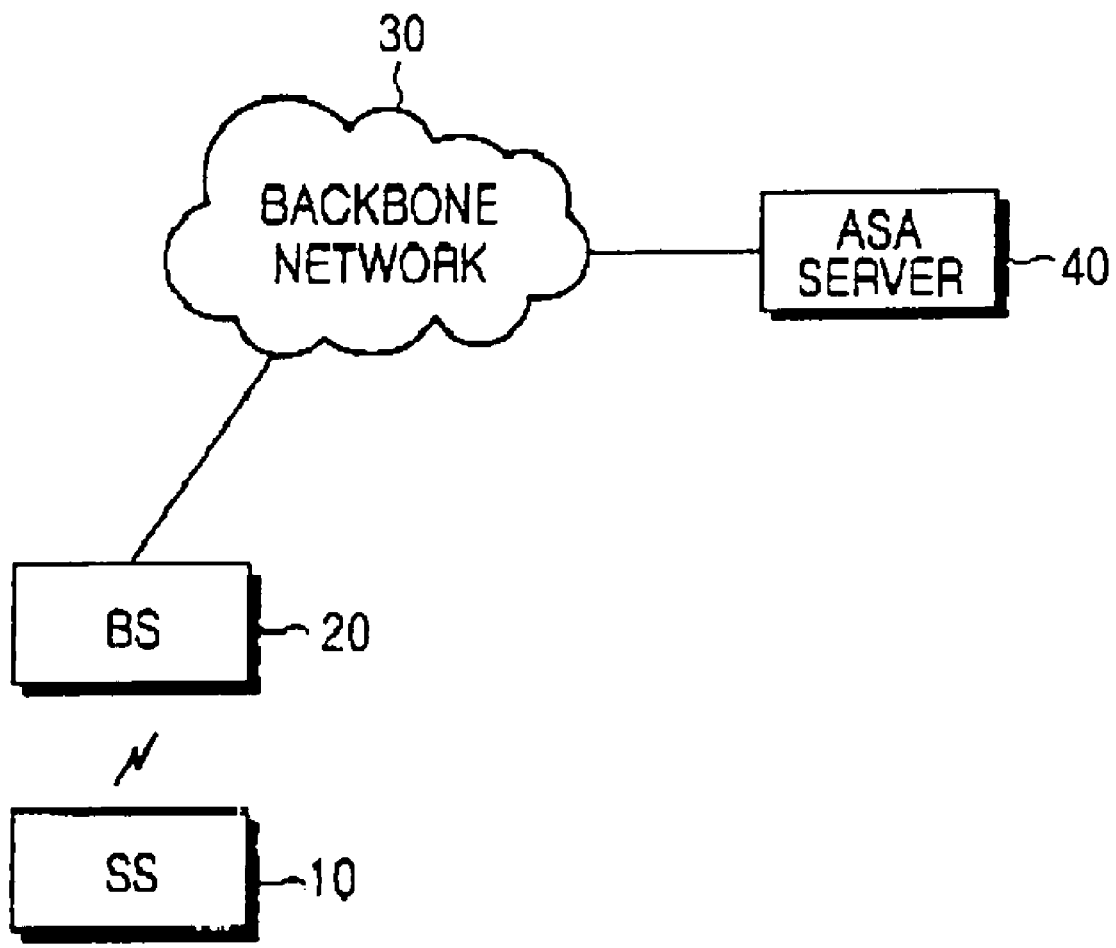
FIG. 1 is a schematic block diagram illustrating the structure of a general Broadband Wireless Access (BWA) communication system.
Figure 2:
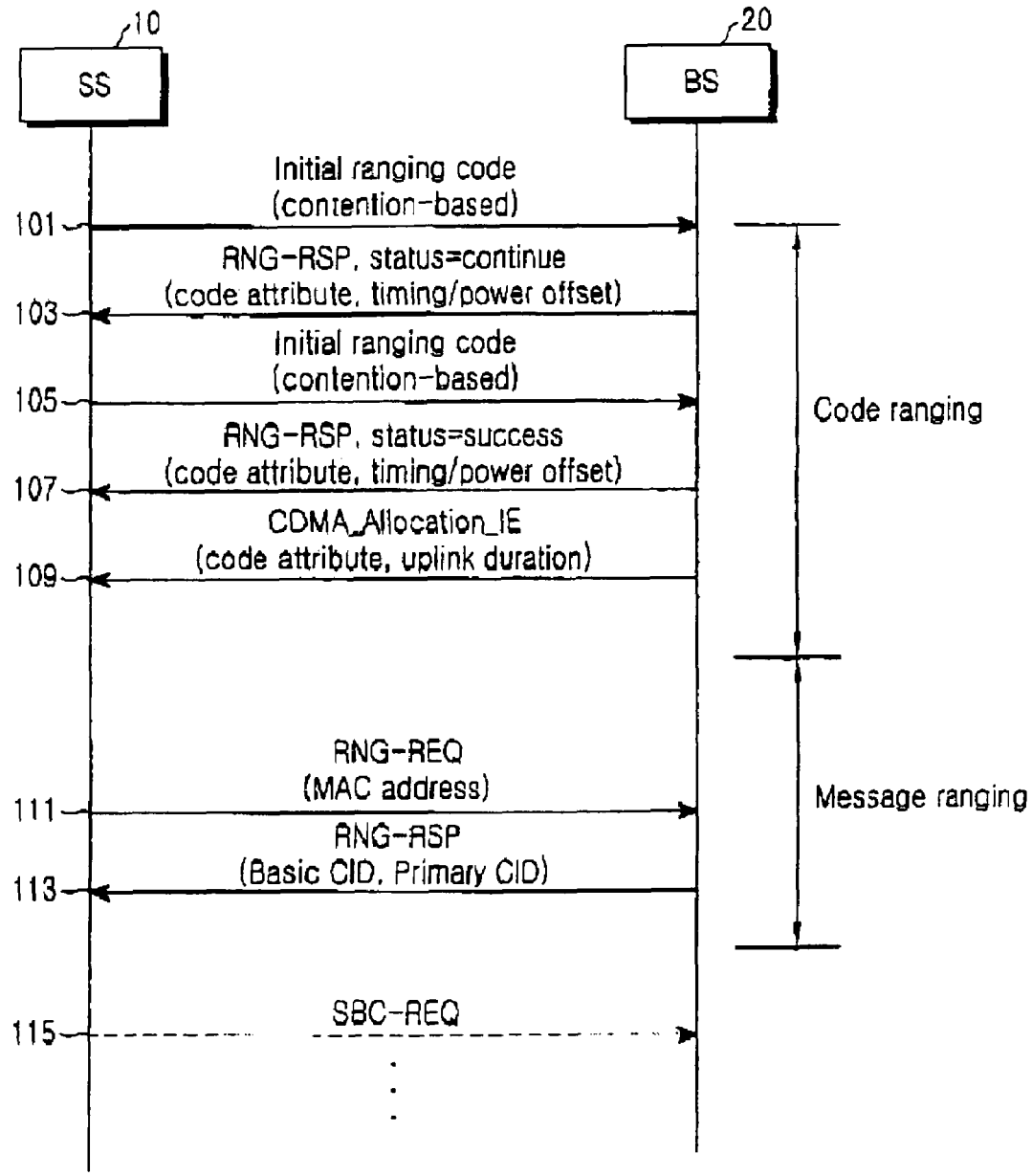
FIG. 2 is a schematic flow diagram for illustrating an initial ranging process for a subscriber station in the BWA communication system.

Preferred embodiments of the present invention will be described herein below with reference to the accompanying drawings. In the drawings, the same or similar elements are denoted by the same reference numerals even though they are depicted in different drawings. In the following description, a detailed description of known functions and configurations incorporated herein has been omitted for conciseness.

The present invention presents an efficient method for an initial network entry of a Subscriber Station (SS) as an UpLink (UL) wireless access method supported in a Broadband Wireless Access (BWA) communication system. In the initial network entry, the SS performs UL synchronization and power adjustment through code ranging. The SS that succeeds in the code ranging is allocated a bandwidth in which it can transmit a Ranging Request (RNG_REQ) message from a Base Station (BS) and can access the network through message ranging of RNG_REQ/Ranging Response (RNG_RSP). However, if the amount of UL resource allocated for the message ranging by the BS to the SS is insufficient, the SS cannot transmit the RNG_REQ message. In the current IEEE 802.16 and 802.16e standards, since the BS cannot know the insufficiency of the UL resource allocated to the SS, the SS must re-attempt code ranging. The present invention provides several ways to overcome these problems. The present invention can be applied to super high-speed wireless Internet networks Although a Code Division Multiple Access (CDMA)_Allocation_Information Element (IE) is used in the present invention, it is nevertheless understood that information in any message format indicating an SS is allocated a UL resource for ranging also be used.

FIG. 3 illustrates information included in a Ranging Request (RNG_REQ) message, and FIG. 4 illustrates information included in a Bandwidth Request message.

Although a message type 201, a Downlink channel ID 203, a Requested Downlink Burst Profile 205, and an SS MAC address 207 are necessarily included in the RNG_REQ message, however the other values shown in FIG. 3 may not be included in the RNG_REQ message.

Referring to FIG. 3, during initial ranging, an SS creates an RNG_REQ message including Type/Length/Value (TLV) fields such as the Requested Downlink Burst Profile 205 and the SS MAC address 207. At this time, TLV fields such as the Requested Downlink Burst Profile 205, Ranging Anomalies, and Adaptive Antenna System (AAS) broadcast capability are included in the RNG_REQ message. A Base Station (BS) considers all possible TLV elements to allocate an UpLink (UL) resource to the SS.

Referring to FIG. 3, during handover ranging, fields such as Serving BS ID, Ranging Purpose Indication, Location update Request, and Paging Controller ID are included in the RNG_REQ message, and fields such as HO ID, Power down Indicator, and Power Saving Class Parameters proposed changes may also be included in the RNG_REQ message. The BS allocates the UL resource for all possible TLV elements.

After the SS succeeds in code ranging, the BS randomly allocates an UL bandwidth through the CDMA_Allocation_IE. The allocated resource may be insufficient for the amount of information of the RNG_REQ message to be transmitted by the SS.

According to a first embodiment of the present invention, when the UL resource allocated by the BS for message ranging of the SS is not sufficient, the SS sends a Bandwidth Request including an initial ranging Connection Identifier (CID) to the BS. In this case, the BS determines the received Bandwidth Request as a Bandwidth Request for ranging and allocates an UL resource to the SS again through the CDMA_Allocation_IE. At this time, since the BS can allocate a sufficient UL resource based on Bandwidth Request information sent from the SS, the SS can transmit the RNG_REQ message, receive a Ranging Response (RNG_RSP) message, and successfully perform message ranging.

According to a second embodiment of the present invention, in resource allocation to the SS that successfully performs code ranging through the CDMA_Allocation_IE, the BS allocates a predetermined UL resource that can include at least basic TLV elements to the SS. Simply the BS allocates the UL resource that is sufficient for transmission of basic information of the SS.

When the allocated amount of UL resource is insufficient for transmission of the RNG_REQ message, the SS transmits the RNG_REQ message including at least the basic information to the BS. Following which the SS informs the BS of its request for additional transmission of the RNG_REQ message by adding, for example, "Ranging Status Indication" information to the RNG_REQ message to request a bandwidth for additional transmission. The "Ranging Status Indication" information may be included in the RNG_REQ message in the form of a TLV field such as "Requested Bandwidth For Next Ranging Request" or a piggyback request. Upon receipt of the RNG_REQ message including the minimum information, the BS allocates a basic CID to the SS. The BS also recognizes that there is information to be additionally transmitted for ranging from the piggyback request transmitted from the SS and allocates the UL resource to the SS.

According to a third embodiment of the present invention, in resource allocation to the SS that successfully performs code ranging through the CDMA_Allocation_IE, the BS determines the amount of UL resource according to conditions for allocation of the UL resource and allocates a sufficient amount of UL resource to the SS. The conditions may include code set information of a CDMA code and ranging interval information transmitted from the SS. Thus, the SS hardly ever experiences the insufficiency of the UL resource for transmission of the RNG_REQ message.

Ranging between a BS 20 and an SS 10 according to the first embodiment of the present invention will be described with reference to the schematic flow diagrams of FIGS. 5 through 7.

Figure 5:
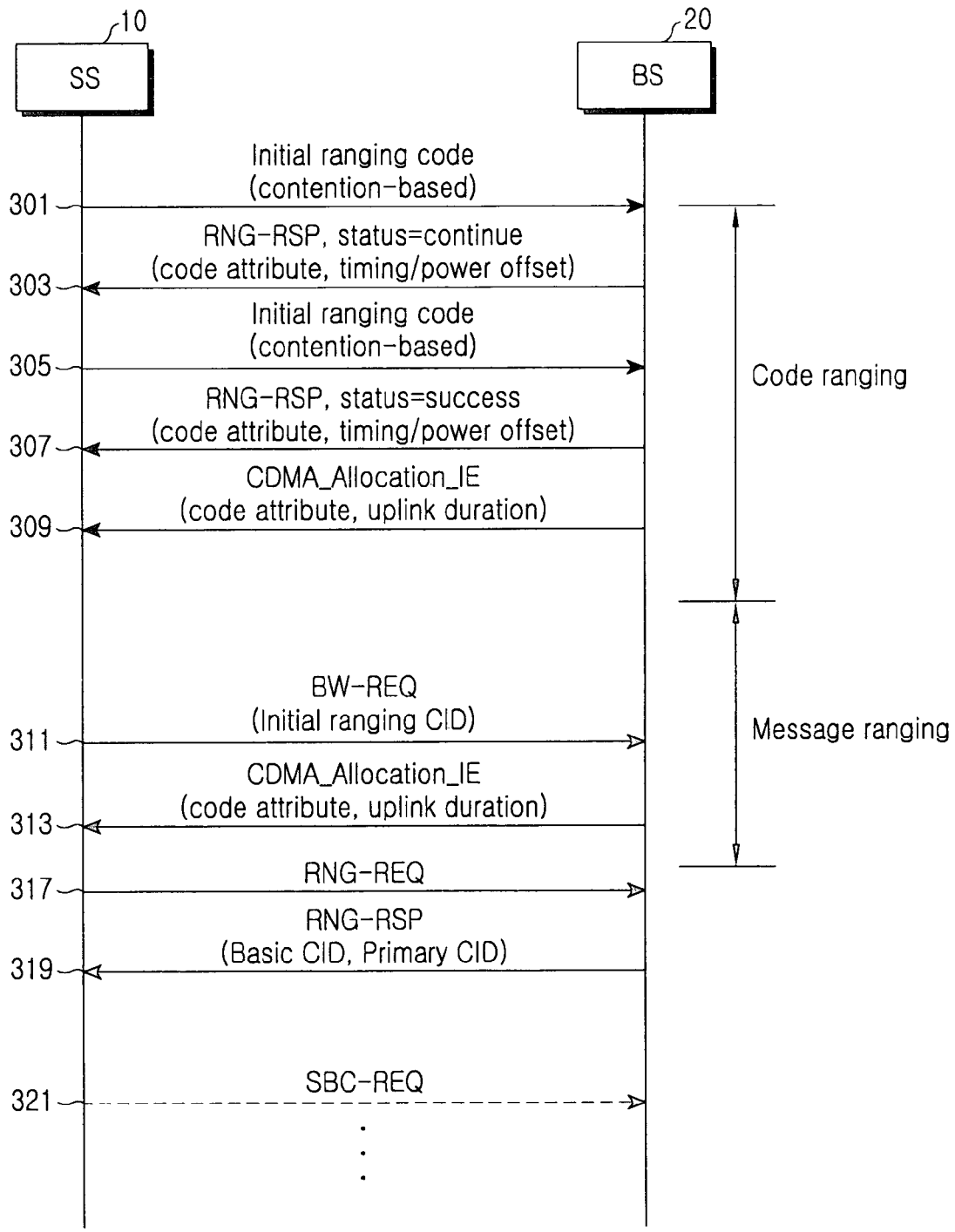
FIG. 5 is a schematic flow diagram for illustrating a message flow in ranging between a Base Station (BS) and a Subscriber Station (SS) according to a first embodiment of the present invention.

FIG. 5 is a flow diagram for illustrating a message flow in ranging between the BS 20 and the SS 10 according to the present invention, FIG. 6 illustrates information included in a Bandwidth Request message according to the present invention, and FIG. 7 illustrates information included in a CDMA_Allocation_IE message according to the present invention.

Referring to FIG. 5, if the amount of UL resources allocated by the BS 20 for message ranging of the SS 10 is not sufficient, the SS 10 sends a Bandwidth Request including an initial ranging CID to the BS 20.

More specifically, the SS 10 transmits an initial ranging code to the BS 20 in a contention-based manner in step 301. The BS 20 marks in a RNG_RSP message code ranging information and a power offset adjustment value transmitted from the SS 10 and broadcasts the RNG_RSP message to the SS 10 in step 303. If the BS 20 determines that timing and power adjustment is completed through the code ranging attempted by the SS 10, it marks the status field of the RNG_RSP message as 'success' and sends the RNG_RSP message.

If the BS 20 determines that additional code ranging is required, it marks a status field of the RNG_RSP message as 'continue' and sends the RNG_RSP message.

If the status field of the RNS_RSP message received in step 303 indicates 'continue', the SS 10 re-attempts the code ranging in step 305. If the BS 20 determines that timing and power adjustment is completed through the code ranging attempted by the SS 10, it marks the status field of the RNG_RSP message as 'success' and sends the RNG_RSP message in step 307. At the same time, the BS 20 also transmits UL-MAP such as a CDMA_Allocation_IE as shown in FIG. 6 to the SS 10 in step 309. The CDMA_Allocation_IE includes the code ranging information transmitted from the SS 10 and the amount of UL resource allocated to the SS 10. If the allocated UL resource is insufficient when the SS 10 desires to transmit the RNG_REQ message for message ranging, the SS 10 transmits a Bandwidth Request header as shown in FIG. 6 in an UL bandwidth in step 311. And the BS 20 transmits UL-MAP such as a CDMA_Allocation_IE the SS 10 in step 311. Referring to FIG. 6, the Bandwidth Request header according to the present invention uses an initial ranging CID in its CID field. That is, the SS 10 transmits the Bandwidth Request header including the initial ranging CID to the BS 20 when the allocated UL resources are insufficient.

Upon receipt of the Bandwidth Request header including the initial ranging CID, the BS 20 determines the received Bandwidth Request header as a Bandwidth Request for ranging and allocates the UL resource again through the CDMA_Allocation_IE. Since the BS 20 can allocate a sufficient UL resource based on Bandwidth Request information sent from the SS 10, the SS 10 can transmit the RNG_REQ message, receive the RNG_RSP message, and successfully perform message ranging.

Following which, the BS 20 marks a ranging code as a predetermined code, e.g., 0x00, in the CDMA_Allocation_IE. The BS 20 marks a symbol and a sub-channel receiving the Bandwidth Request header on a ranging symbol and a ranging sub-channel of the CDMA_Allocation_IE. In other words, since the BS 20 unaware of cannot know the SS 10 requesting a bandwidth, it transmits the CDMA_Allocation_IE in the positions of the ranging symbol and the ranging sub-channel to which the SS 10 transmits the Bandwidth Request header. Thus, the SS 10 can recognize from the ranging code that the CDMA_Allocation_IE is intended for bandwidth allocation for transmission of the RNG_REQ message. The SS 10 can identify the CDMA_Allocation_IE transmitted as a response to the Bandwidth Request header based on the positions of the ranging symbol and the ranging sub-channel.

In other words, when the ranging code is 0x00, the SS 10 receiving the CDMA_Allocation_IE determines that the received CDMA_Allocation_IE is information allocated in response to the Bandwidth Request through the initial ranging CID. The SS 10 compares the ranging symbol value and the ranging sub-channel value of the received CDMA_Allocation_IE with the positions of the ranging symbol and the ranging sub-channel to which the SS 10 transmits the Bandwidth Request header. If the ranging code is 0x00 and the ranging symbol value and the ranging sub-channel value of the received CDMA_Allocation_IE are the same as the position of the ranging symbol and the ranging sub-channel to which the SS 10 transmits the Bandwidth Request header, the SS 10 transmits its RNG_REQ message in the allocated UL bandwidth in step 317. The CDMA_Allocation_IE according to the present invention, shown in FIG. 7, uses the format of a conventional CDMA_Allocation_IE. According to an embodiment of the present invention, the SS 10 determines from the ranging code whether values included in the CDMA_Allocation_IE are used for ranging or bandwidth allocation.

The ranging process is completed once the SS 10 receives the RNG_RSP message from the BS 20 in step 319. The SS 10 then transmits an SS Basic Capability (SBC)_REQ message for capabilities negotiation in step 321.

As such, upon receiving the Bandwidth Request header including the initial ranging CID, the BS 20 determines the received Bandwidth Request header as a Bandwidth Request for ranging and allocates a UL bandwidth again through the CDMA_Allocation_IE. In this case, since the BS 20 can allocate a sufficient UL resource through Bandwidth Request information transmitted from the SS 10, the SS 10 can transmit the RNG_REQ message, receive the RNG_RSP message, and successfully perform message-ranging process. In the present invention, the Bandwidth Request header may include a CID in any format without being limited to the initial ranging CID.

Ranging between the BS 20 and the SS 10 according to the second embodiment of the present invention will be described with reference to FIGS. 8 through 10.

Figure 8:
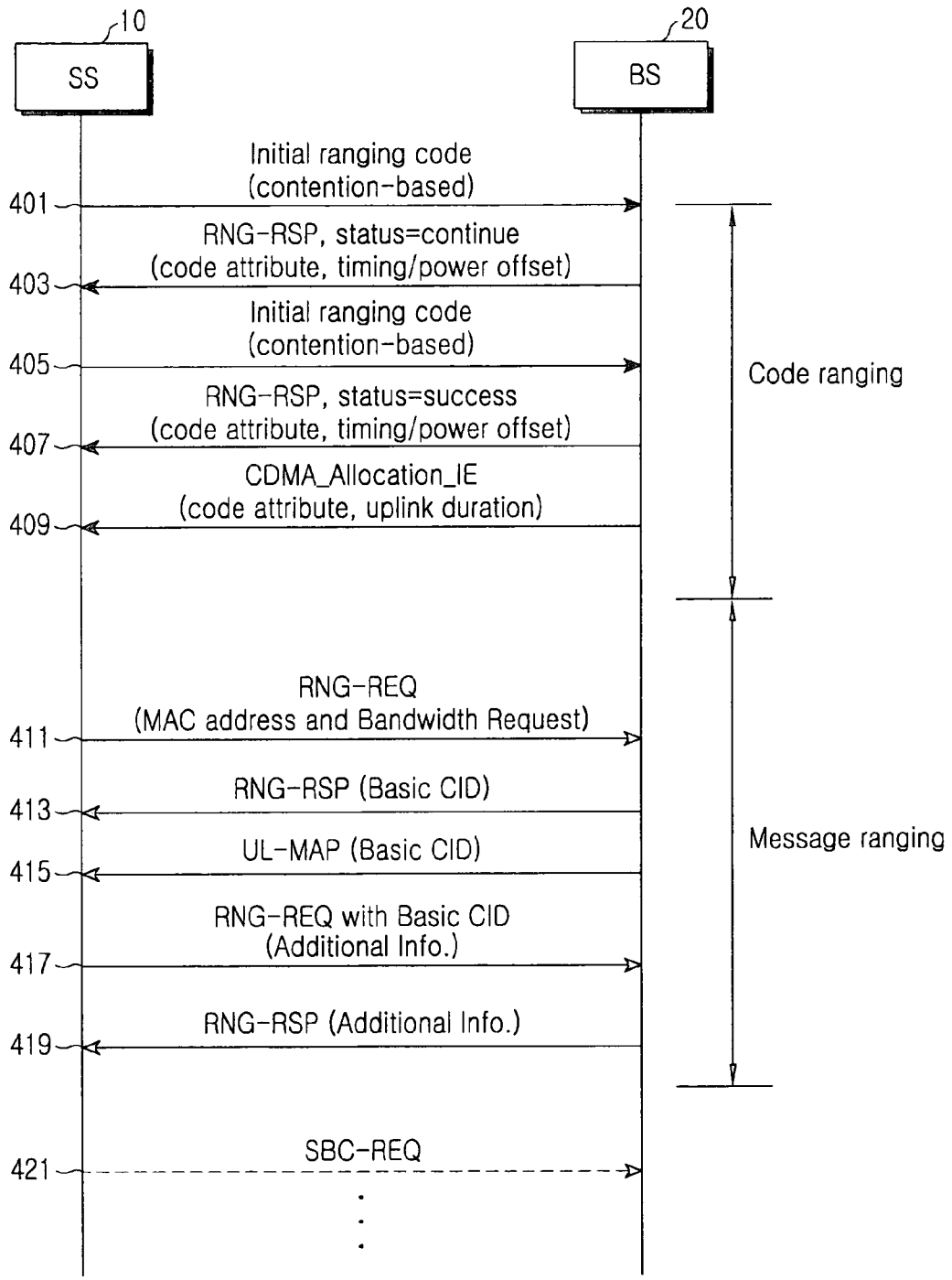
FIG. 8 is a schematic flow diagram for illustrating a message flow in raging between a BS and an SS according to a second embodiment of the present invention.

FIG. 8 is a schematic flow diagram for illustrating a message flow in raging between the BS 20 and the SS 10 according to the present invention. Referring to FIG. 8, in resource allocation to the SS 10 that successfully performs code ranging through the CDMA_Allocation_IE, the BS 20 allocates to the SS 10 aUL resource that is larger than the minimum resource that allows transmission of at least necessary TLV information.

More specifically, the SS 10 transmits an initial ranging code to the BS 20 in a contention-based manner in step 401. The BS 20 marks in the RNG_RSP message code ranging information and a power offset adjustment value transmitted from the SS 10 and broadcasts the RNG_RSP message in step 403. If the status field of the received RNG_RSP message indicates 'continue', the SS 10 re-attempts code ranging in step 405. If the BS 20 determines that timing and power adjustment is completed through the code ranging attempted by the SS 10, it marks the status field of the RNG_RSP message as 'success' and transmits the RNG_RSP message in step 407.

In step 409, the BS 20 transmits to the SS 10 the CDMA_Allocation_IE that is allocated a UL resource that allows transmission of at least basic information. For example, the BS 20 transmits to the SS 10 the CDMA_Allocation_IE that is allocated the UL resource that allows loading of the message type 201, the Downlink channel ID 203, the Requested Downlink Burst Profile 205, and the SS MAC address in the RNG_REQ message as shown in FIG. 3 as necessary ranging information.

Simply the BS 20 allocates the UL resource that is larger than "Minimum Resource For Ranging Request" to the SS 10 that successfully completes code ranging through the CDMA_Allocation_IE. The "Minimum Resource For Ranging Request" indicates the amount of UL resources that can support the RNG_REQ message including the minimum information such as a MAC header, a Grant sub-header, and an MAC address of the SS 10.

The SS 10 transmits the RNG_REQ message including at least the basic information to the BS 20 in step 411. At this time, if the SS 10 has additional RNG_REQ information to be transmitted to the BS 20, it marks the presence of the additional RNG_REQ information or a bandwidth allocation request in the RNG_REQ message. In other words, if the allocated amount of UL resource is not sufficient for transmission of the RNG_REQ message, the SS 10 informs the BS 20 of its request for additional transmission of the RNG_REQ message by adding, for example, "Ranging Status Indication" information to the RNG_REQ message to request a bandwidth for the additional transmission. The "Ranging Status Indication" information can be included in the RNG_REQ message in the form of a TLV field such as "Requested Bandwidth For Next Ranging Request" or a piggyback request. In other words, the marking of the bandwidth allocation request or the marking of the presence of the additional RNG_REQ information may be performed by encapsulating the piggyback request for the bandwidth allocation request in the RNG_REQ message or adding a TLV field for the bandwidth allocation request to the payload of the RNG_REQ message. However, the present invention is not limited to the foregoing example, and the bandwidth allocation request may be marked in the RNG_REQ message using any method that can be implemented by those skilled in the art.

When the piggyback request for the bandwidth allocation request is added to the RNG_REQ message, the format of the RNG_REQ message is as shown in FIG. 9. Referring to FIG. 9, an RNG_REQ message 430 includes a header 431, a sub-header 433, and a payload 435. Since the UL resources are allocated to load the minimum information in the RNG_REQ message, the SS 10 transmits the RNG-REQ message including the minimum information (e.g., the MAC address) and the piggyback (bandwidth) request to a UL if having additional ranging information to be transmitted in addition to the necessary ranging information. The piggyback request is intended for bandwidth allocation for additional transmission of information for ranging from the SS 10 to the BS 20. The presence of the sub-header can be indicated by a Type field of the header 431 which has a value indicating the presence of the piggyback request as shown in FIG. 10.

Figures 11, 12:
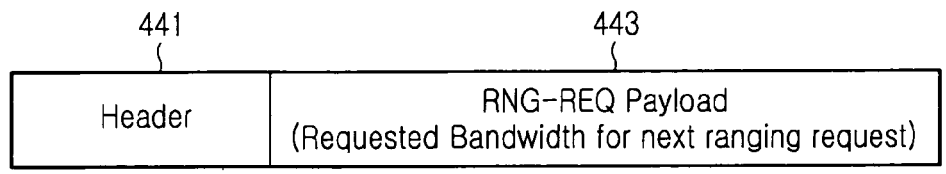
FIG. 11 illustrates the format of an RNG_REQ message according to modification to the present invention.
FIG. 12 illustrates information included in a payload of the RNG_REQ message of FIG. 11.

When the TLV field for the bandwidth allocation request is added to a payload of the RNG_REQ message, the format of the RNG_REQ message transmitted to the BS 20 is as shown in FIG. 11. FIG. 12 illustrates information included in the payload of the RNG_REQ message of FIG. 11. Referring to FIG. 11, an RNG_REQ message 440 includes a header 441 and a payload 443. If the SS 10 has additional ranging information to be transmitted in addition to the necessary ranging information, it transmits the RNG_REQ message 440 including the minimum information (e.g., MAC address) and a TLV field 450 for the bandwidth allocation request to the UL. The TLV field 450 for the bandwidth allocation request may be added to the payload 443 of the RNG_REQ message 440 as shown in FIG. 12 and may be referred to as "Requested Bandwidth For Next Ranging Request". The size of the TLV field 450 for the bandwidth allocation request can be appropriately determined by those skilled in the art.

The BS 20 receiving the RNG_REQ message allocates a basic CID to the SS 10 through the minimum information (e.g., MAC address) of the SS 10 and responds to the RNG_REQ message with the RNG_RSP message. At this time, when the SS 10 transmits the piggyback request or the TLV field for the bandwidth allocation request, the BS 20 determines that there is additional ranging information to be transmitted from MS 10 and allocates the UL resources to the SS 10 using the basic CID in step 415 of FIG. 8. Thus, the SS 10 additionally transmits the RNG_REQ message through the basic CID in the allocated UL bandwidth in step 417 of FIG. 8 and receives the RNG_RSP message as a response to the RNG_REQ message from the BS 20 in step 419 of FIG. 8.

Figure 13:
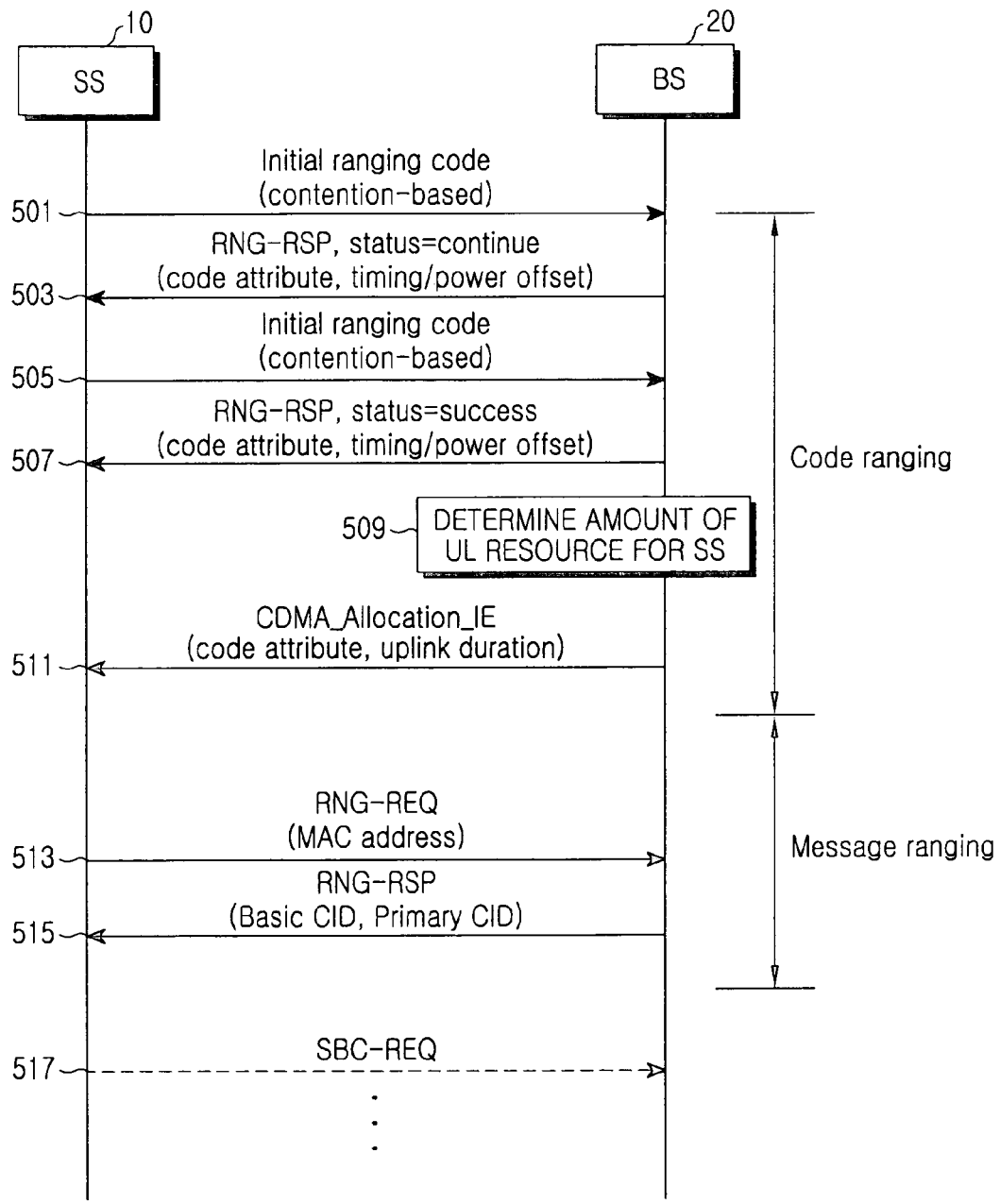
FIG. 13 is a schematic flow diagram for illustrating a message flow in ranging between a BS and an SS according to a third embodiment of the present invention.

Ranging between the BS 20 and the SS 10 according to the third embodiment of the present invention will be described with reference to FIGS. 3, 13, and 14. FIG. 13 is a schematic flow diagram illustrating a message flow in ranging between the BS 20 and the SS 10 according to the present invention, and FIG. 14 illustrates information that can be contained in an RNG_RSP message in initial network entry and information that can be contained in an RNG_RSP message in handoff.

In resource allocation to the SS 10 that successfully performs code ranging through a CDMA_Allocation_IE, the BS 20 determines the amount of UL resources according to conditions for allocation of UL resources and allocates the UL resources to the SS 10 according to that determination.

More specifically, the SS 10 transmits an initial ranging code to the BS 20 in a contention-based manner in step 501. The BS 20 marks in an RNG_RSP message code ranging information and a power offset adjustment value transmitted from the SS 10 and broadcasts the RNG_RSP message in step 503. If the status field of the received RNG_RSP message indicates 'continue', the SS 10 re-attempts code ranging in step 505. If the BS 20 determines that timing and power adjustment is appropriately performed through code ranging, it marks the status field of the RNG_RSP message as 'success' and sends the RNG_RSP message to the SS 10 in step 507.

The BS 20 determines the amount of UL resource according to conditions for allocation of the UL resource. One of the key conditions for determination of the size of the RNG_REQ message is whether the RNG_REQ message is intended for initial network entry or network re-entry resulting from handoff. Determination about this condition can be made by the BS 20 from the ranging code. An initial ranging code set and a handover ranging code set are defined differently and UL contention intervals therefore are allocated differently. Thus, the BS 20 can determine an entry status of the SS 10 based on the ranging code and interval information transmitted from the SS 10 and determine the amount of UL resource to be allocated to the SS 10. FIG. 14 illustrates information that can be included in the RNG_RSP message in initial network entry and information that can be included in the RNG_RSP message in handoff. According to the conditions, the BS 20 determines the amount of UL resource that is sufficient for the SS 10 to transmit all ranging information (all TLV elements) to the BS 20.

For instance, in initial ranging, the SS 10 creates the RNG_REQ message including TLV fields such as Requested Downlink Burst Profile and SS MAC Address. Further, TLV fields such as Requested Downlink Burst Profile, Ranging Anomalies, and AAS broadcast capability may be included in the RNG_REQ message (see FIG. 3). In response to the created RNG_REQ message, the BS 20 determines the sufficient amount of UL resources based on all possible TLV elements for allocation of the UL resources (UL bandwidth) to the SS 10 and allocates the UL resources to the SS 10 according to the determination. For example, during handover ranging, the SS 10 may create the RNG_REQ message including fields such as Serving BS ID, Ranging Purpose Indication, Location Update Request, and Paging Controller ID. Further, fields such as HO ID (Hanover Identifier), Power down Indicator, and Power Saving Class Parameters Proposed Changes may be included in the created RNG_REQ message (see FIG. 3). In response to the created RNG_REQ message, the BS 20 determines the sufficient amount of UL resources based on all possible TLV elements for allocation of the UL resources (UL bandwidth) to the SS 10 and allocates the UL resources to the SS 10 according to the determination.

As a result, the SS 10 hardly ever experiences the insufficiency of the UL resources for transmission of the RNG_REQ message.

The BS 20 then allocates to the SS 10 the CDMA_Allocation_IE that is allocated the UL resources in step 511. The SS 10 transmits the RNG_REQ message in the allocated UL bandwidth in step 513. According to the present invention, because of being allocated the sufficient UL resources from the BS 20, the SS 10 does not need to request the BS 20 to allocate a bandwidth for additional transmission of the RNG_REQ message.

The BS 20 transmits the RNG_RSP message to the SS 10 in step 515, and thus completing the ranging process. In step 517, the SS 10 transmits the SBC_REQ message for capabilities negotiation through the basic CID and the primary CID included in the RNG_RSP message.

The configurations and operations of the SS 10 and the BS 20 according to the present invention will be described below in detail with reference to FIGS. 15 and 16.

Figure 15:
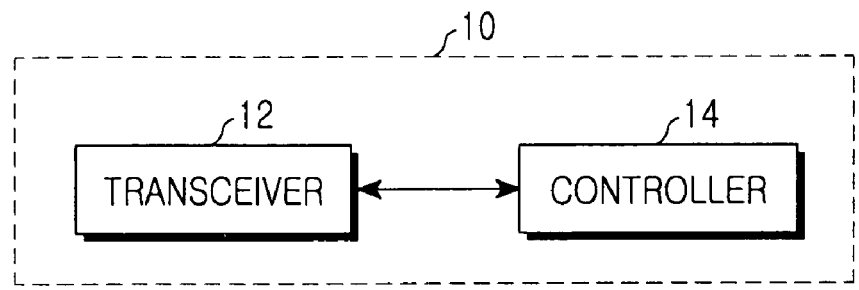
FIG. 15 is a block diagram illustrating an SS according to the present invention.

FIG. 15 is a block diagram of the SS 10 according to present invention. Referring to FIG. 15, the SS 10 includes a transceiver 12 and a controller 14. The transceiver 12 transceives messages for the ranging process. According to the present invention, the controller 14 transmits the Bandwidth Request including the initial ranging CID to the BS 20 through the transceiver 12 when the UL resources allocated for transmission of the RNG_REQ message are insufficient. When the ranging code of the CDMA_Allocation_IE transmitted from the BS 20 is 0x00, the controller 14 determines that the received CDMA_Allocation_IE is information allocated in response to the Bandwidth Request through the initial ranging CID. The controller 14 compares the ranging symbol value and the ranging sub-channel value of the received CDMA_Allocation_IE with the positions of the ranging symbol and the ranging sub-channel to which the SS 10 transmits the Bandwidth Request header. If the ranging code is 0x00 and the ranging symbol value and the ranging sub-channel value of the received CDMA_Allocation_IE are the same as the position of the ranging symbol and the ranging sub-channel to which the SS 10 transmits the Bandwidth Request header, the controller 14 transmits its RNG_REQ message through the transceiver 12 to the BS 20 in the allocated UL bandwidth.

According to the present invention, if the allocated amount of UL resources are insufficient for transmission of the RNG_REQ message, the controller 14 transmits the RNG_REQ message including a TLV field such as "Requested Bandwidth For Next Ranging Request" or a piggyback request to the BS 20 through the transceiver 12 to request a bandwidth for additional transmission. The marking of the bandwidth allocation request or the marking of the presence of the additional RNG_REQ information may be performed by encapsulating the piggyback request for the bandwidth allocation request in the RNG_REQ message or adding a TLV field for the bandwidth allocation request to the payload of the RNG_REQ message. If having additional RNG_REQ information to be transmitted to the BS 20, the controller 14 creates the RNG_REQ message including the piggyback request or "Requested Bandwidth F Next Ranging Request" for the bandwidth allocation request and transmits the created RNG_REQ message to the BS 20.

Upon being allocated the basic CID from the BS 20 through the RNG_RSP message, the controller 14 additionally transmits the RNG_REQ message.

If the initially allocated UL resources are sufficient, the controller 14 can transmit all ranging information to the BS 20 through single transmission of the RNG_REQ message.

Figure 16:
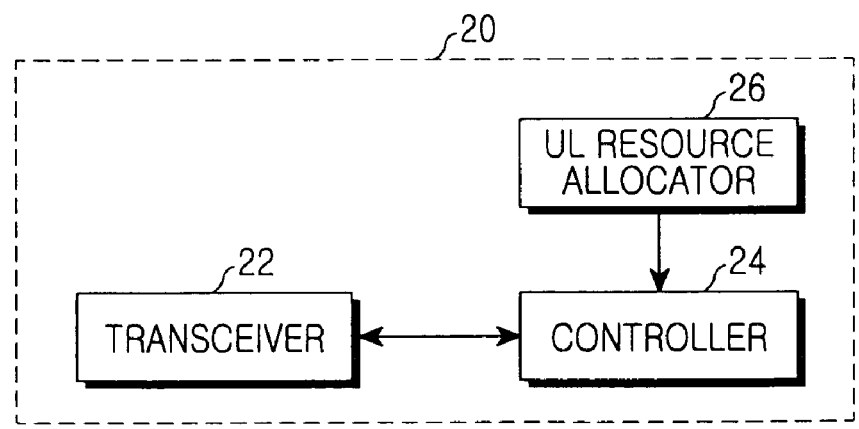
FIG. 16 is a block diagram illustrating a BS according to the present invention.

FIG. 16 is a block diagram of the BS 20 according to present invention. Referring to FIG. 16, the BS 20 includes a transceiver 22, a controller 24, and a UL resource allocator 26. The transceiver 24 transceives messages for the ranging process. According to the present invention, upon receipt of the Bandwidth Request including the initial ranging CID, the controller 24 determines the received Bandwidth Request as a Bandwidth Request for ranging. Thus, the UL resource allocator 26 allocates the UL bandwidth again to the SS 10 through the CDMA_Allocation_IE. At this time, the controller 24 transmits the CDMA_Allocation_IE in the positions of the ranging symbol and the ranging sub-channel receiving the Bandwidth Request in response to the Bandwidth Request.

According to the present invention, in resource transmission to the SS 10 that successfully performs code ranging through the CDMA_Allocation_IE, the UL resource allocator 26 allocates the minimum amount of UL resources to the SS 10. In other words, the UL resource allocator 26 allocates the UL resource that is larger than "Minimum Resource For Ranging Request" to the SS 10 that successfully performs coding ranging. At this time, "Minimum Resource For Ranging Request" indicates the amount of UL resources that can support the RNG_REQ message including the minimum information such as a MAC header, a Grant sub-header, and an MAC address of the SS 10.

Upon receiving the RNG_REQ message from the SS 10, the controller 24 transmits the RNG_RSP message allocated the basic CID through the minimum information (MAC address) of the SS 10 to the SS 10. The controller 24 also determines whether the presence of additional RNG_REQ information or the bandwidth allocation request is marked in the RNG_REQ message received from the SS 10. For example, the controller 24 determines whether the received RNG_REQ message includes the piggyback request or "Requested Bandwidth for next ranging request". If the presence of additional RNG_REQ information or the bandwidth allocation request is marked in the received RNG_REQ message, the controller 24 controls the UL resource allocator 26 to allocate the UL resources again to the SS 10 through the basic CID.

According to the present invention, in resource allocation to the SS 10 that successfully performs coding ranging through the CDMA_Allocation_IE, the UL resource allocator 26 determines the amount of UL resources according to conditions for allocation of the UL resources and allocates the UL resources to the SS 10 according to the determination. As mentioned above, one of the key conditions for determination of the size of the RNG_REQ message is whether the RNG_REQ message is intended for initial network entry or network re-entry resulting from handoff. According to such conditions, the UL resource allocator 26 can allocate the UL resources that are sufficient for the SS 10 to transmit all ranging information to the BS 20. The controller 24 transmits the CDMA_Allocation_IE that is allocated the determined amount of UL resources to the SS 10 through the transceiver 22.

In the present invention, the SS can efficiently perform the ranging process even when the amount of resources allocated during initial ranging is insufficient. If a Subscriber Station (SS) detects the insufficiency of an UpLink (UL) resources for transmission of a Ranging Request (RNG_REQ) message during the ranging process, it transmits a UL resource allocation request message requesting additional allocation of the UL resources to a Base Station (BS) for additional transmission of the RNG_REQ message to cause the BS to additionally allocate the UL resources for the additional transmission of the RNG_REQ message. Thus, it is possible to reduce a delay that may occur in the network entry of the SS.

While the present invention has been shown and described with reference to preferred embodiments thereof, it will be understood by those skilled in the art that various changes in form and details may be made therein without departing from the spirit and scope of the invention. For example, the present invention can be applied to IEEE 802.16/802.16e Orthogonal Frequency Division Multiple Access (OFDMA) systems.

What is claimed is:

1. A subscriber station for performing a ranging process in a communication system, the subscriber station comprising:
    a controller for detecting that an insufficiency of an UpLink (UL) resource renders the subscriber station unable to transmit a Ranging Request (RNG_REQ) message including full information, and able to transmit the RNG_REQ message including minimum information and a bandwidth request used for requesting an allocation for a UL resource for an additional transmission of the RNG_REQ message; and
    a transceiver for transmitting the RNG_REQ message including the minimum information and the bandwidth request to a base station,
    wherein the minimum information includes at least one Medium Access Control (MAC) address.

2. The subscriber station of claim 1, wherein the bandwidth request includes a predetermined Connection IDentifier (CID).

3. The subscriber station of claim 1, wherein the transceiver receives a Code Division Multiple Access (CDMA)_Allocation_Information Element (IE) from the base station after transmitting the RNG_REQ message, and
    if a ranging code included in the CDMA_Allocation_IE has a predetermined value, the controller determines the CDMA_Allocation_IE as information regarding an allocated UL resource, allocated by the base station, for the additional transmission of the RNG_REQ message.

4. The subscriber station of claim 1, wherein the subscriber station is a subscriber station that succeeds in a code ranging.

5. The subscriber station of claim 1, wherein the transceiver receives a Code Division Multiple Access_Allocation_Information Element (CDMA_Allocation_IE) from the base station before the detection, and
    wherein the CDMA_Allocation_IE includes information regarding an allocated UL resource, allocated by the base station, for transmission of the RNG_REQ message including the minimum information and the bandwidth request.

6. The subscriber station of claim 5, wherein the bandwidth request is included in the RNG_REQ message in the form of a Type/Length/Value (TLV) field or a piggyback request, and includes a predetermined Connection IDentifier (CID).

7. The subscriber station of claim 6, wherein subscriber station is a subscriber station that succeeds in a code ranging.

8. A base station for performing a ranging process in a communication system, the base station comprising:
    a transceiver for receiving a Ranging Request (RNG_REQ) message including minimum information and a bandwidth request used for requesting an allocation for an UpLink(UL) resource for an additional transmission of the RNG_REQ message from a subscriber station; and
    a controller for allocating a UL resource to the subscriber station for the additional transmission of the RNG_REQ message if receiving from the subscriber station, the RNG_REQ message including the minimum information and the bandwidth request,
    wherein the RNG_REQ message is transmitted by the subscriber station of the subscriber station detects that an insufficiency of a UL resource renders the subscriber station unable to transmit an RNG_REQ message including full information, and able to transmit the RNG_REQ message including the minimum information and the bandwidth request,
    wherein the minimum information includes at least one Medium Access Control (MAC) address.

9. The base station of claim 8, wherein the bandwidth request includes a predetermined Connection IDentifier (CID).

10. The base station of claim 8, wherein subscriber station is a subscriber station that succeeds in a code ranging.

11. The base station of claim 8, wherein the transceiver transmits a Code Division Multiple Access_Allocation_Information Element (CDMA_Allocation_IE) to the subscriber station before the allocation, and
    wherein the CDMA_Allocation_IE includes information regarding an allocated UL resource by the base station for transmission of the RNG_REQ message including the minimum information and the bandwidth request.

12. The base station of claim 11, wherein the bandwidth request is included in the RNG_REQ message in the form of a Type/Length/Value (TLV) field or a piggyback request, and includes a predetermined Connection IDentifier (ID).

13. The base station of claim 12, wherein subscriber station is a subscriber station that succeeds in a code ranging.

14. The base station of claim 11, wherein the transceiver transmits a Code Division Multiple Access_Allocation_Information Element (CDMA_Allocation_IE) to the subscriber station after allocating the UL resource; and
    the controller marks a ranging code included in the CDMA_Allocation_IE as a predetermined value in order to indicate the CDMA_Allocation_IE is information regarding an allocated UL resource by the base station for the additional transmission of the RNG_REQ message.

15. A method for performing a ranging process, by a subscriber station, in a communication system, the method comprising the steps of:

detecting that an insufficiency of an UpLink (UL) resource renders the subscriber station unable to transmit a Ranging Request (RNG_REQ) message including full information, and able to transmit the RNG_REQ message including minimum information and a bandwidth request used for requesting an allocation for a UL resource for an additional transmission of the RNG_REQ message; and transmitting the RNG_REQ message including the minimum information and the bandwidth request to a base station, wherein the minimum information includes at least one Medium Access Control (MAC) address.

16. The method of claim 15, wherein the bandwidth request includes a predetermined Connection IDentifier (CID).

17. The method of claim 16, wherein the CID is a basic CID.

18. The method of claim 15, further comprising:
receiving a Code Division Multiple Access (CDMA)_Allocation_Information Element_(IE) from the base station after transmitting the RNG_REQ message; and
if a ranging code included in the CDMA_Allocation_IE has a predetermined value, determining the CDMA_Allocation_IE to be information regarding an allocated UL resource by the base station for the additional transmission of the RNG_REQ message.

19. The method of claim 15, wherein subscriber station is a subscriber station that succeeds in a code ranging.

20. The method of claim 15, further comprising receiving a Code Division Multiple Access_Allocation_Information Element (CDMA_Allocation_IE) from the base station before the detection, and
wherein the CDMA_Allocation_IE includes information regarding an allocated UL resource, allocated by the base station, for transmission of the RNG_REQ message including the minimum information and the bandwidth request.

21. The method of claim 20, wherein the bandwidth request is included in the RNG_REQ message in the form of a Type/Length/Value (TLV) field or a piggyback request, and includes a predetermined Connection IDentifier (CID).

22. The method of claim 21, wherein the subscriber station is a subscriber station that succeeds in a code ranging.

23. A method for performing a ranging process, by a base station in a communication system, the method comprising the steps of:

receiving from a subscriber station, a Ranging Request (RNG_REQ) message including minimum information and a bandwidth request used for requesting an allocation for an UpLink (UL) resource for an additional transmission of the RNG_REQ message; and allocating a UL resource to the subscriber station for the additional transmission of the RNG_REQ message, wherein the RNG_REQ message is transmitted by the subscriber station if the subscriber station detects that an insufficiency of a UL resource renders the subscriber station unable to transmit an RENG_REQ message including full information, and able to transmit the RNG_REQ message including the minimum information and the bandwidth request, and wherein the minimum information includes at least one Medium Access Control (MAC) address.

24. The method of claim 23, wherein the bandwidth request includes a predetermined Connection IDentifier (CID).

25. The method of claim 24, further comprising:
transmitting a Code Division Multiple Access_Allocation_Information Element (CDMA_Allocation_IE) to the subscriber station after allocating the UL resource; and
marking a ranging code included in the CDMA_Allocation_IE as a predetermined value in order to indicate the CDMA_Allocation_IE is information regarding an allocated UL resource by the base station for the additional transmission of the RNG_REQ message.

26. The method of claim 23, wherein subscriber station is a subscriber station that succeeds in a code ranging.

27. The method of claim 24, further comprising transmitting a Code Division Multiple Access_Allocation_Information Element (CDMA_Allocation_IE) to the subscriber station before the allocation,
wherein the CDMA_Allocation_IE includes information regarding an allocated UL resource by the base station for transmission of the RNG_REQ message including the minimum information and the bandwidth request.

28. The method of claim 27, wherein the bandwidth request is included in the RNG_REQ message in the form of a Type/Length/Value (TLV) field or a piggyback request, and includes a predetermined Connection IDentifier (CID).

29. The method of claim 28, wherein the subscriber station is a subscriber station that succeeds in a code ranging.

* * * * *

UNITED STATES PATENT AND TRADEMARK OFFICE
CERTIFICATE OF CORRECTION

PATENT NO. : 7,620,020 B2
APPLICATION NO. : 11/370289
DATED : November 17, 2009
INVENTOR(S) : Lim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Twenty-sixth Day of October, 2010

David J. Kappos
*Director of the United States Patent and Trademark Office*